United States Patent [19]

Saruwatari

[11] 4,188,751
[45] Feb. 19, 1980

[54] MAGNETIC SEED TREATING DEVICE

[76] Inventor: Minoru Saruwatari, 1030-34th Ave., SE., Calgary, Alberta, Canada, T2G 1V4

[21] Appl. No.: 827,415

[22] Filed: Aug. 24, 1977

Related U.S. Application Data

[63] Continuation-in-part of Ser. No. 647,483, Jan. 8, 1976, abandoned.

[30] Foreign Application Priority Data

Oct. 23, 1975 [CA] Canada ................................. 238193

[51] Int. Cl.² ............................................ A01G 7/04
[52] U.S. Cl. ........................................................ 47/1.3
[58] Field of Search ........................................... 47/1.3

[56] References Cited

U.S. PATENT DOCUMENTS

| | | | |
|---|---|---|---|
| 225,029 | 3/1880 | Thayer et al. | 209/229 X |
| 242,013 | 5/1881 | Martin | 209/229 X |
| 971,692 | 10/1910 | Schnelle | 209/231 X |
| 2,825,464 | 3/1956 | Mack | 210/222 |
| 3,345,594 | 10/1967 | Vermeiren | 210/222 X |
| 3,675,367 | 7/1972 | Amburn | 47/1.3 |
| 3,765,125 | 10/1973 | Amburn | 47/1.3 |
| 4,020,590 | 5/1977 | Davis | 47/1.3 |

FOREIGN PATENT DOCUMENTS

| | | | |
|---|---|---|---|
| 58797 | 6/1890 | Fed. Rep. of Germany | 210/222 |
| 204276 | 8/1965 | Sweden | 210/222 |

OTHER PUBLICATIONS

Maronek, D. M., 1975, "Electromagnetic Seed Treatment Increases Germination of *Koelreuteria paniculata* Laxm," from *Hortscience*, vol. 10(3), Jun., pp. 227, 228.
Pittman, U. J. et al., 1970, "Physiological and Chemical Features of Magnetically Treated Winter Wheat Seeds and Resultant Seedlings,"*Canadian Journal of Plant Science*, May, vol. 50(3), pp. 211–217.
Pittman, U. J. (1977), "Effects of Magnetic Seed Treatment on Yields of Barley, Wheat, and Oats in Southern Alberta," *Can. J. Plant Sci.*, vol. 37, No. 7 (Jan. 1977).

*Primary Examiner*—Edgar S. Burr
*Assistant Examiner*—James R. Feyrer
*Attorney, Agent, or Firm*—Sughrue, Rothwell, Mion, Zinn and Macpeak

[57] ABSTRACT

A device for magnetically treating seeds prior to planting so as to increase the yield of plants grown from the seeds. The device includes a tubular member provided with an internal support for securing a permanent magnet therein so that as seeds are poured through the tubular member, they are magnetically treated. The magnet, which has opposite poles disposed at opposite ends thereof, is oriented with its longitudinal axis extending in the direction of the passage, the passage adjacent the magnet being of substantially annular shape in cross-section whereby a uniform cylindrical shaped magnetic field occupies the annular passage through which the grain must pass. The tubular member has a converging portion in the direction of seed travel so as to provide an area of maximum constriction adjacent the magnet which results in the seeds being funnelled radially inward towards the more concentrated magnetic field closest to the magnet. The converging or constricted portion may be shaped to provide the flow of seeds along streamlines so that the rate of flow is enhanced.

31 Claims, 8 Drawing Figures

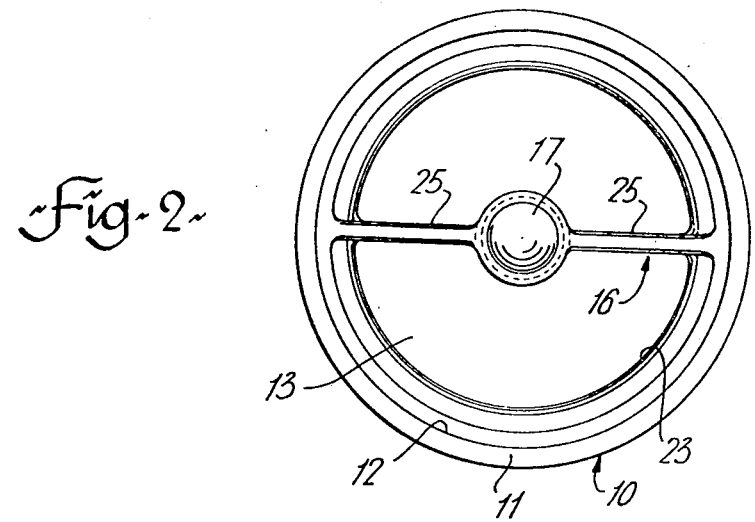
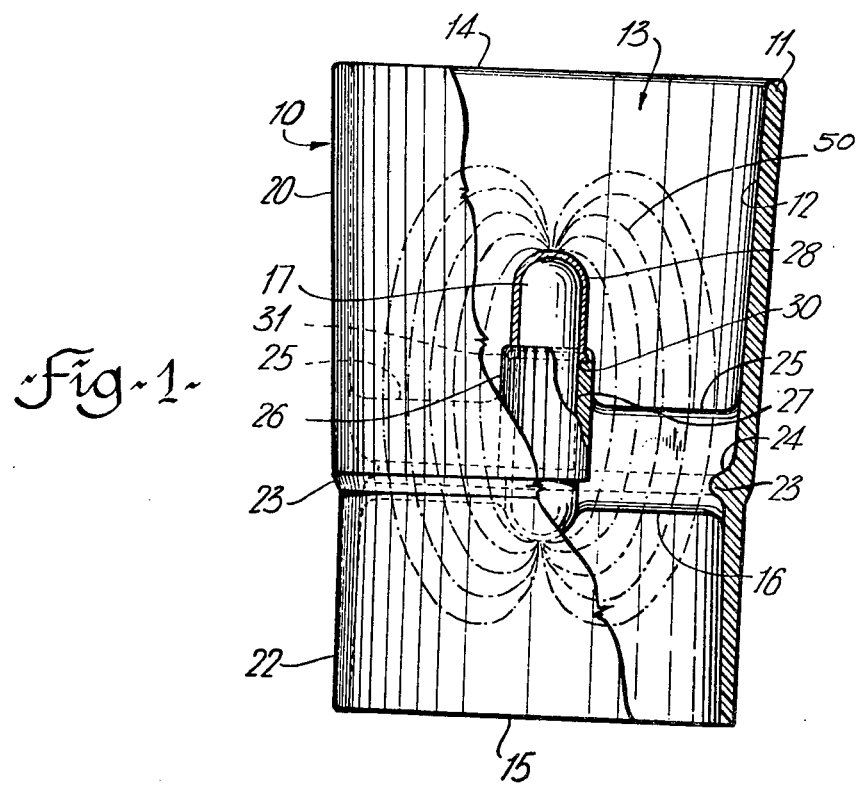

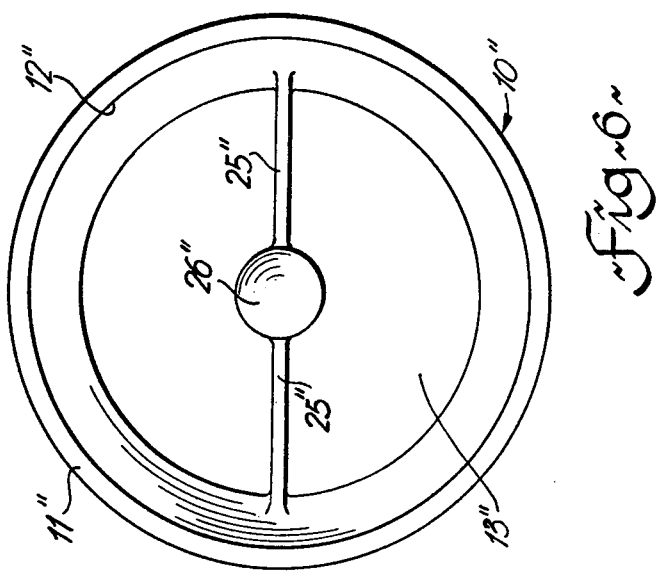
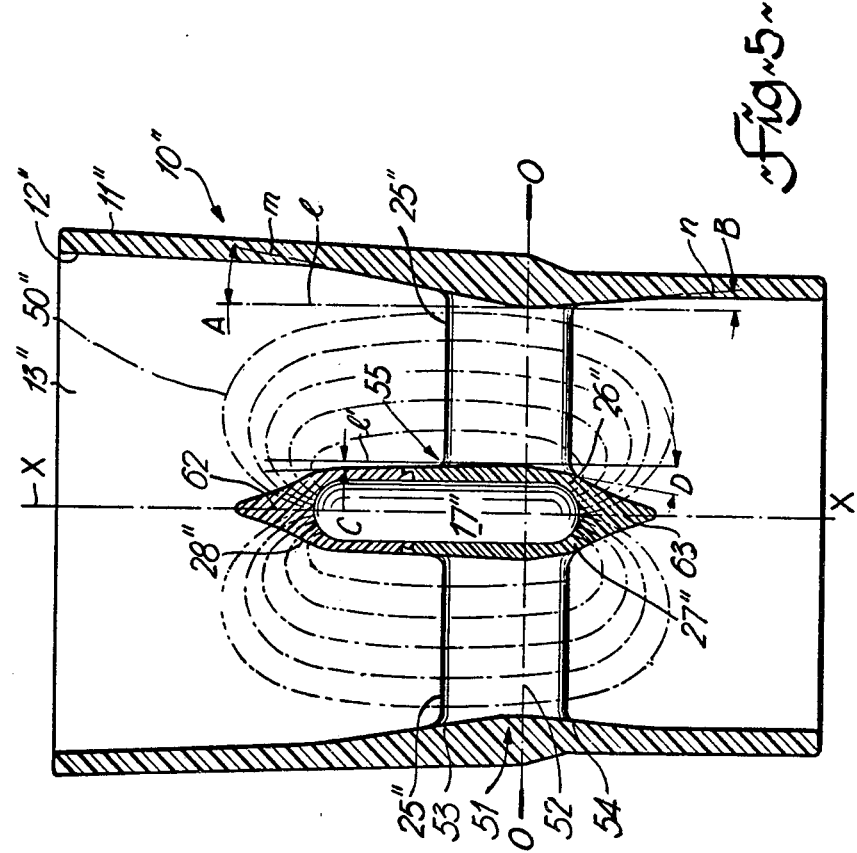

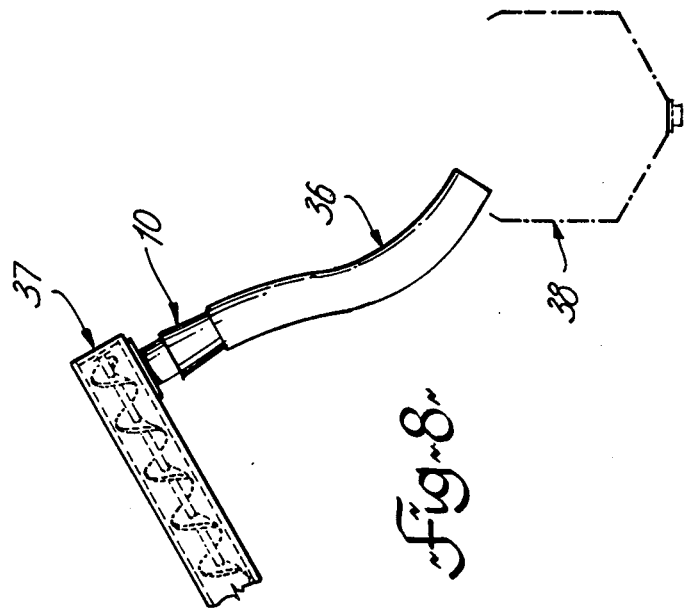
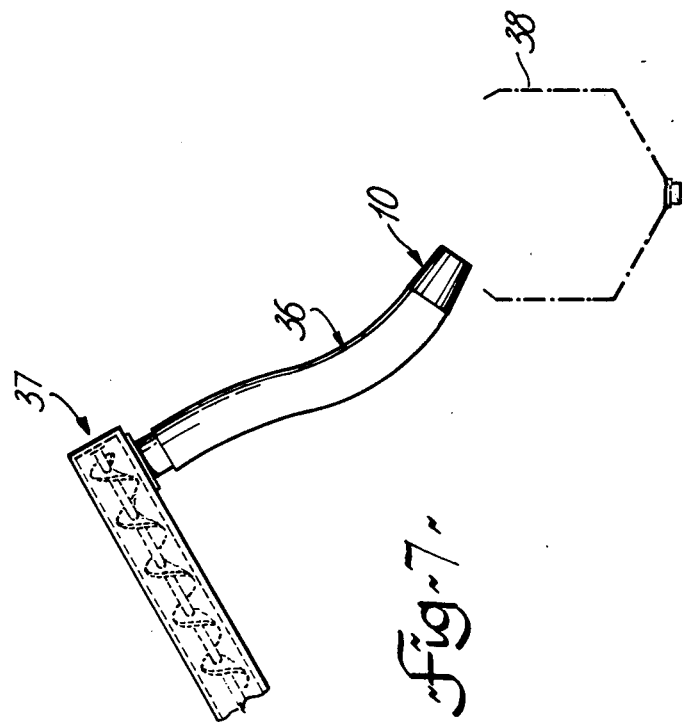

MAGNETIC SEED TREATING DEVICE

This is a continuation-in-part of U.S. patent application Ser. No. 647,483, filed Jan. 8, 1976, now abandoned.

This invention relates to a seed treating device, and more particularly to a device for magnetically treating seeds, such as grain, prior to planting.

It has been established that the magnetic treatment of numerous varieties of seed prior to planting results in improved crop yield, tests having shown that the seed germinates earlier and the crop maturity is accelerated. As a result, there are now available a number of commercial devices for magnetically treating large quantities of seed in a short period of time. A majority of such devices use an electromagnetic having its field disposed about a grain chute or a plurality of permanent magnets arranged about the chute. These types of devices have tended to be relatively expensive to produce. In the case of the electromagnets it is necessary of course to provide a source of electricity, and in the case of the device using a plurality of permanent magnets, distorted magnetic fields can result in non-uniform treatment. In attempts to provide a device using a single permanent magnet, it has been found that sufficient field and uniform treatment are not always obtainable.

It is an object of the present invention to provide a magnetic seed treating device which is economical to produce and yet will provide relatively uniform magnetic treatment of seeds.

It is a further object of the present invention to provide a seed treater which is capable of treating seed at a high rate while still ensuring that a majority of the seed is effectively exposed to the magnet flux lines within the grain passageway.

According to one aspect of the present invention, there is provided a tubular member defining an internal seed passageway extending between an inlet end and outlet end of the device. A permanent magnet, which has a longitudinal axis extending between its opposite poles, is secured coaxially within the passageway by way of mounting means. The magnetic field is thus disposed concentrically in the passageway about the magnet, and fullest advantage is taken of the two zones of maximum density in the area of the poles.

According to another aspect of the invention the passageway has a constricted portion between the magnet and the tubular member. In one embodiment of the invention the internal surface has a converging section in an annular portion of the passageway about the magnet so as to form a constriction whereby the seed is funnelled toward the magnet. The funnelling effect results in the seed passing through an area adjacent the magnet where the magnetic field is the strongest.

According to yet another aspect of the present invention, there is provided a device which includes a tubular member having an inner wall defining an internal seed passageway extending therethrough and magnetic means for providing an area of concentrated flux lines in the passageway. The inner wall has means for funnelling the seed centrally of the passageway in the area of the concentrated magnetic flux lines, the funnelling means having an area of minimum constriction on a plane normal to central axis of the passageway. The constricted portion has a first converging part extending in the direction of the seed flow and merging smoothly into a second diverging part at the plane of maximum constriction. The first part converges at a gradual angle relative to the axis of the passageway, and the second part diverges at a gradual angle relative to the axis of the passageway downstream of the plane of maximum constriction. In the device the seed follows streamlines in passing through the area of concentrated flux lines so that a much higher rate of flow is achieved.

The magnetic means may be in the form of an elongated permanent magnet having its poles at opposite ends thereof, mounting means being provided for mounting the magnet substantially coaxially in the passageway so as to provide the area of concentrated magnetic flux lines in an annular space about the magnet.

In an embodiment of the invention the mounting means includes a magnet enclosing capsule centrally mounted in the passageway by at least one radially extending web, the capsule having a forward end in the direction of flow of the seed, which end is of conical configuration.

Preferably the converging part of the constricted portion has a maximum angle of about 15° relative to the axis of the passageway, and the diverging part has a maximum divergent angle of about 5° relative to the axis of the passageway.

Referring now to the accompanying drawings which illustrate certain embodiments of the invention by the way of examples.

FIG. 1 is a partial cross-section view through a preferred embodiment of the device forming the present invention;

FIG. 2 is an end view of the device shown in FIG. 1;

FIG. 5 is a cross-sectional view through another embodiment of the seed treater of the present invention;

FIG. 6 is a top view of the embodiment of FIG. 5;

FIGS. 7 and 8 show alternative ways in which the device may be mounted for use in a seed drill loading auger.

Figure 4:
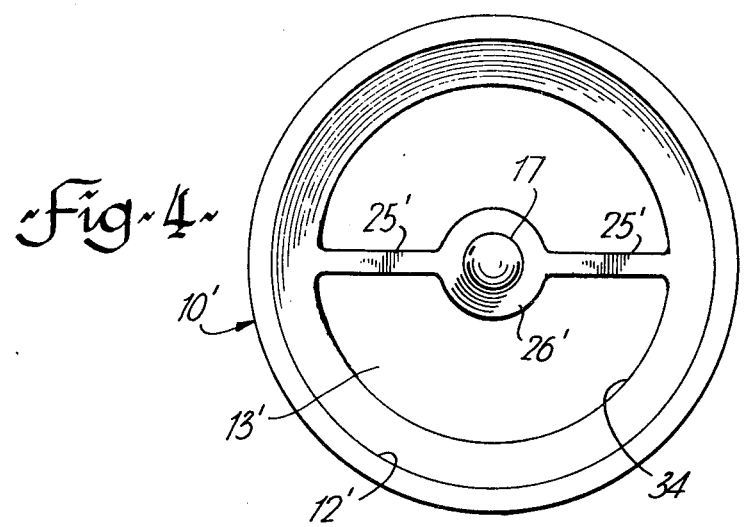
FIG. 4 is an end view of the device of FIG. 3.

In FIGS. 1 and 2, the magnetic seed treating device is generally denoted by the reference number 10. The device includes a tubular member 11 having an inner surface 12 defining an internal seed passageway 13 extending between a seed inlet end 14 and a seed outlet end 15. Internally of the tubular member 11, there is provided a mounting means 16 which secures a permanent magnet 17 centrally within the passageway 13.

The tubular member 13 is of circular cross-section and is, therefore of substantially cylindrical shape. As viewed in FIG. 1, the tubular member 13 includes an upper portion 20 at its inlet end and a lower portion 21 at its outlet end, the upper and lower portions being separated by a central portion 22 surrounding the magnet 17. The upper portion 20 may taper or converge slightly towards the central portion, and the central portion 22 is provided with an internal ridge 23 encircling the magnet. The internal or inner surface 12 is substantially cylindrical in shape, and an upper surface 24 of the ridge, which is contiguous with the inner surface 12, turns rather abruptly towards the centrally disposed magnet so as to form a constriction for causing the grain to be funnelled towards the magnet.

The mounting means includes radially extending webs 25,25 which may be diametrically aligned on opposite sides of an enlarged central portion 26. The portion 26 is in the form of a capsule containing the magnet 17, the capsule including a main body portion 27 and a removable cap 28. The body portion 27 has an internal groove 30 which receives a flange 31 formed on the cap 28 so that the cap snaps into place. The body portion 27 and cap 28 define an interior cavity which is only slightly larger than the magnet 17.

The tubular member 11, internal ridge 23, webs 25,25 and enlarged central portion 26 are preferably moulded as an integral unit of non-magnetic material, such as a durable elastomer capable of withstanding rugged use and exposure to weather. As an alternative to the capsule shown in FIG. 1, the magnet may be moulded completely within the central portion, but with the arrangement shown, the magnet can be inserted after the integral unit is removed from the mould, and additionally the magnet can be replaced in the event it loses its strength during operation.

The magnet 17 is in the form of an elongated bar magnet of substantially cylindrical shape except in the embodiment shown the opposite ends are rounded. The magnet is elongated, nevertheless and the opposite poles thereof are located at opposite ends of the magnet. The longitudinal axis of the magnet is disposed on the central axis of the tubular member so that the passageway 13 within the central portion 22 is of annular cross-section and interrupted only by webs 25,25.

In the above description the portion 20 has been described as the upper portion, although it is apparent the device may be inverted and the seed fed in through end 15 which has been described as the outlet end. Regardless of the direction of the flow of seed through the device 10, the seeds pass through the relatively uniform flux field 50 in the annular passageway and are exposed to the more concentrated fields at opposite ends of the magnet. Although the presence of the magnet in effect provides a constriction within the tubular member 11, the ridge 23 funnels the grain towards the magnet so that a larger portion of the grain is exposed to the denser flux lines adjacent the magnet.

Figure 3:
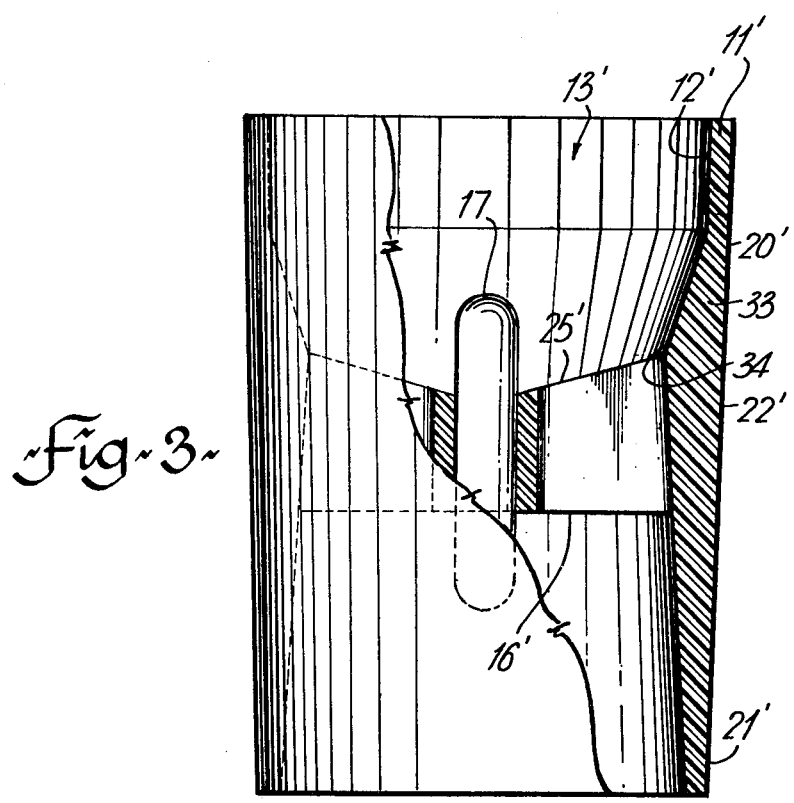
FIG. 3 is a view similar to FIG. 1 of the device forming another embodiment of the invention.

The magnetic seed treating device 10' as shown in FIGS. 3 and 4 shows an integrally moulded unit including a tubular member 11' and mounting means 16' and in which the magnet 17 is moulded into the enlarged central portion 22' of the mounting means 16. The magnet is of the same configuration shown in the previously described embodiment. The central portion 22' is of a less complex structure than the arrangement described above, but tests seem to indicate that it is less desirable to have the opposite ends of the magnet exposed. Certain stunting of seed growth in some instances may be due, it is believed, to direct contact of the seeds with the poles of the magnet.

It may be noted that the constriction in the embodiment of FIGS. 3 and 4 is accomplished in a different manner. The upper portion 20' has a wall section 33 which increases in thickness towards the central portion 22' so that the interior surface 12 converges towards the annular passageway surrounding the magnet. Having reached a point of maximum constriction at 34, the wall thickness decreases towards the seed outlet end of the device. The constriction again has the effect of funnelling the seed towards the magnet.

It would appear that for effective treatment of seeds of most grain crops, the seeds should be exposed to a magnetic field density which generally falls within the range of 50 to 500 gauss. In the design of the treaters, the outer diameter of the tubular member through which the seed is passed is selected so as to be connectable to the standard flex spout of existing grain fill augers, as will be discussed further below. The size of the tubular member is also selected to allow sufficient flow so as to be practical in mass treatment of seed either when used in a drill filling auger or when the seed is being handled for some other reason prior to being planted. The constricted portion is provided in the tubular member so as to funnel the seed toward the magnet so as to ensure sufficient exposure to flux density but without unduly retarding the flow of the grain through the device.

Referring now to FIGS. 5 & 6, the magnetic seed treater 10" of the present invention includes a tubular member 11" having a central axis X—X and an inner wall 12" defining a seed passageway 13". A magnetic means which is shown in the form of an elongated, cylindrical bar magnet 17" having its north and south poles disposed at opposite ends, is mounted centrally of the passageway 13", so as to provide an area of concentrated magnetic flux lines 50" within the passageway. The inner wall 12" has a constricted portion 51 providing an area of maximum constriction 52 on a plane 0—0 which is normal to the axis X—X of the passageway. The constricted portion 51 has a first converging part 53 extending in the direction of seed flow through the device 10", and the converging part 53 merges smoothly at the plane 0—0 into a second part of the constricted portion, the second part being a divergent part 54. The first or converging part 53 converges at a very gradual angle relative to the axis X—X, and the second or diverging part diverges 54 at a very gradual angle relative to the axis X—X.

The bar magnet is inclosed in a capsule 26" which forms part of a mounting means 55, the mounting means 55 and the tubular member preferably being moulded as a unit from non-magnetic material, such as a durable elastomer capable of rough handling and exposure to the weather. The capsule 26" is supported by radial web means which is shown in the form of a pair of thin webs 25", 25" which are disposed on the same diameter line extending across the annular space between the capsule 26" and the inner wall. The capsule 26" has a main body portion 27"0 which is moulded integrally with the webs and a removable cap 28" so that the elastomer unit can be moulded without the magnet. After the moulding process, the cylindrical magnet 17" is inserted into the capsule and the cap 28" is snapped into place. With this arrangement the magnet may be replaced if for any reason it does not maintain sufficient magnetism.

It has been found by having the part 53 converging at a gradual angle relative to the axes of the passageway and by having the part 54 diverging at a gradual angle, laminar or streamline flow of seed can be achieved and this in turn results in an increased capacity for the device. The converging part 53 has been found to produce the most desirable flow if, when going in the direction of the seed flow, the surface curves gradually outward from the constant diameter of the inner wall above the constricted portion, reaches the greatest convergent angle slightly short of the plane 0—0 and then becomes more and more parallel to the inner wall above the constricted portion as the surface approaches plane 0—0. This configuration of the converging part 53 can be explained in another way. If one considers a tangent line m drawn to a point on the curved surface of the converging part 53 slightly upstream from plane 0—0, this tangent line would be at a maximum angle relative to the axis X—X of the passageway. In the drawings there is shown such an angle A between tangent line m and line L drawn parallel to the axis X—X. This maximum size angle A for a seed treater designed to treat grain such as barley, oates, wheat, etc. should be about 15°. Other tangents drawn closer and closer to the plane 0—0 would be at a smaller and smaller angle relative to axis X—X. Also tangents taken upstream from tangent line m would be no greater than 15° and are preferable of a smaller and smaller angle as the tangent point approaches the beginning of the constricted portion.

Slightly downstream from plane 0—0 a tangent line n is drawn to illustrate the maximum angle B of the divergent part which angle is preferable about 5°. Taking a tangent at a successive number of points from plane 0—0, the angle of the tangent relative to line L, or alternatively axis X—X, becomes larger and larger towards the tangent point of line n, and then at a smaller and smaller angle downstream from the tangent line n.

The outer peripheral cylindrical wall of the capsule preferably has its maximum diameter at the plane 0—0 for moulding purposes, thereby providing a draft angle C upstream of plane 0—0 and a draft angle D downstream, the line L' being parallel to axis X—X. The draft angle C is preferably no greater than 1° so that the total convergence towards the plane 0—0, i.e. angle A+C, is about 16°. The draft angle downstream of plane 0—0, which is shown as angle D, may be in the order of 10°, thereby providing a total divergent angle, i.e. B+D, of about the same as the total convergent angle.

The upper or upstream end of the capsule includes a pointed portion 62 which is basically of conical shape. At the lower end of the portion 62, it merges smoothly into the outer cylindrical surface of the capsule. The lower or downstream end of the capsule may have a similar pointed end portion 63.

In tests conducted with the device of the present invention, which tests included the use of photography, it may be observed that laminar flow developes, i.e. the grain flows in streamlines, in the constricted area having the features described above for FIGS. 5 and 6. In volume testing, which was conducted by permitting barley to pour through the treater of the present invention at a full flow rate, 360 bushels may be treated per hour. In the treater, such as that shown in FIGS. 1 and 2, the flow rate under the same conditions is about 180 bushels per hour. The treaters of FIGS. 1 and 2 and of FIGS. 5 and 6, which were tested had the same internal diameters at inlet and outlet, the same diameter for the maximum constriction, and the same capsule diameter so that it can be concluded that the increase in coefficient of discharge is due solely to the selected shape of the constricted portion and its relationship to the selected shape of the capsule. It has been further observed by the way of photography that the kernals or seeds spread out to substantially fill the cross-section area of the tubular member in the passageway below the plane 0—0 because of the streamline type of flow which is not the case in the above-discussed earlier treaters. It is believed that this spreading out, as compared to the compacted flow previously experienced, while still in the area of concentrated flux lines results in more effective magnetic treatment.

The pointed upper end portion 62 prevents any slowing of the flow at the upper end of the capsule. It has appeared that seeds which have momentarily become stopped or slowed significantly in their flow at the very end of the magnet may show signs of stunted growth for reasons which are not entirely clear. Possible over exposure due to the closeness to the magnet or the particular orientation assumed by some of the seeds immediately adjacent the pole of the magnet has some detrimental effect on the seeds. The pointed forward end of the capsule contributes to the streamline flow through the constriction and prevents seeds from entering an area immediately adjacent the pole of the magnet.

Although seed may be treated at some time in advance to the planting, additional handling of the seed can be avoided by clamping or otherwise fastening the device into a flex spout 36 of a drill fill auger 37 shown in part in FIGS. 7 and 8. As illustrated in these two Figures the device 10 or 10' may be in a position either between the spout 36 and the auger 37 (FIG. 8) or at the outlet end of the spout 37 (FIG. 7). In either case the seed discharged by the auger 37 passes through the magnetic seed treating device before it enters the box 38 of the seed drill during the filling operation of the box 38.

The above-described embodiments are shown as illustrations of the present invention, it being apparent that various modifications would be obvious to those skilled in the art without departing from the spirit of the invention as defined in the appending claims.

The embodiments of the invention in which an exclusive property or privilege is claimed are defined as follows:

1. A magnetic seed treating device comprising a tubular member defining an internal seed passageway extending between an inlet end and an outlet end thereof, means to subject seeds traversing said passageway to a magnetic field consisting of a permanent magnet having a longitudinal axis extending between opposite poles thereof, the means mounting said magnet coaxially within said passageway.

2. A device as defined in claim 1, wherein said tubular member defines an internal surface of substantially cylindrical shape, said passageway having a substantially annular cross-sectional portion about said magnet.

3. A device as defined in claim 1, wherein said tubular member and the mounting means are formed of nonmagnetic material.

4. A device as defined in claim 1, wherein the mounting means includes a web extending substantially diametrically across said tubular member.

5. A device as defined in claim 1, wherein said mounting means includes an enlarged central portion supported by radially extending webs, said magnet being moulded into said central portion.

6. A device as defined in claim 2, wherein said internal surface has a converging section in the annular portion of the passageway so as to form a constriction whereby the seed is funnelled toward said magnet.

7. A device as defined in claim 6, wherein said constriction is formed by a thickened wall portion of said tubular member.

8. A device as defined in claim 1, wherein said mounting means includes a central portion encapsulating said magnet and supported by radially extending webs.

9. A device defined in claim 8, wherein the encapsulating portion is in the form of a chamber provided with a removable cap.

10. A device as defined in claim 7, wherein said tubular member, webs and central portion are formed as an integral unit moulded of elastomeric material.

11. A magnetic seed treating device comprising a tubular member defining an internal seed passageway extending between an inlet end and an outlet end, means for subjecting seeds traversing said passageway to a magnetic field consisting of permanent magnet means, mounting means securing said magnet means in a central position in said passageway, said magnet means including a magnet having a longitudinal axis extending between opposite poles thereof, the longitudinal axis being disposed in the same direction as travel of seed through said tubular member and said axis of the magnet being disposed substantially on a central axis of said passageway, said passageway having a constricted portion between said magnet means and said tubular member.

12. A device as defined in claim 11, wherein said mounting means includes a web extending diametrically across said passageway.

13. A device as defined in claim 11, wherein said tubular member is of substantially cylindrical shape having an internal surface defining the outside of said passageway, said internal surface having a portion thereof converging in a direction from said outlet end towards said magnet, the converging portion providing an area of maximum constriction adjacent said magnet whereby seeds are funnelled radially inward towards said magnet.

14. A device as defined in claim 11, wherein said magnet means is a substantially cylindrical shaped bar magnet with opposite poles disposed at opposite ends thereof, said magnet being coaxially disposed within said passageway.

15. A device as defined in claim 14, wherein said constricted portion of said passageway is of substantially annular shape in cross-section.

16. A device as defined in claim 14, wherein said mounting means includes a central capsule portion enclosing said magnet, said central portion being supported by radial webs fixed to said tubular member.

17. A device as defined in claim 16, wherein said capsule portion has a removable cap whereby said magnet may be replaced.

18. A device as defined in claim 14, wherein said mounting means includes a central enlarged portion supported by radially extending webs, said magnet being moulded into said enlarged portion.

19. A device as defined in claim 16, wherein said tubular member, webs and central portion are moulded as an integral unit of elastomer.

20. A device as defined in claim 14, wherein the constriction portion of said passageway includes an internal ridge in said tubular member and concentrically surrounding said magnet so as to cause a funnelling effect towards the magnet in said constricted portion.

21. A device as defined in claim 20, wherein the tubular member has a substantially cylindrical internal surface, said ridge having a surface contiguous with said internal surface in said direction of travel of seed, the ridge surface turning abruptly towards said magnet to form a converging outer wall of the passageway.

22. A magnetic seed treating device comprising a tubular member having an inner wall defining an internal seed passageway extending therethrough, means to subject seeds traversing said passageway to a magnetic field consisting of permanent magnetic means in said passageway for providing an area of concentrated flux lines in said passageway, said inner wall having a constricted portion for funnelling the seed centrally of said passageway in said area of concentrated magnetic flux lines, funnelling means having an area of maximum constriction on a plane normal to a central axis of the passageway, said constricted portion having a first converging part extending in the direction of seed flow and merging smoothly into a second diverging part at said plane of maximum constriction, said first part converging at a gradual angle relative to the axis of the passageway, said second part diverging at a gradual angle relative to the axis of the passageway downstream of said plane of maximum constriction whereby the seed follows streamlines in passing through the area of concentrated flux lines.

23. A magnetic seed treating device of claim 22, wherein the converging part of the constricted portion has a maximum convergent angle of about 15° relative to the axis of passageway.

24. A magnetic seed treating device of claim 22, wherein the diverging part of the constricted portion has a maximum divergent angle of about 5° relative to the axis of the passageway.

25. A magnetic seed treating device as defined in claim 24, wherein said magnetic means including an elongated permanent magnet having opposite poles at opposite ends thereof, and means mounting said magnet substantially coaxially in said passageway for providing said area of concentrated magnetic flux lines in an annular space about the magnet.

26. A magnetic seed treating device as defined in claim 25, wherein the mounting means includes a magnet enclosing capsule centrally mounted in the passageway by at least one radially extending web, said capsule having an end of conical configuration pointing upstream of the passageway.

27. A magnetic seed treating device as defined in claim 25, wherein the mounting means includes a magnet enclosing capsule, of a hollow elongated configuration and radially extending web means mounting said capsule substantially coaxially within said passageway, said capsule having pointed opposite end portions each converging to the axis of said passageway.

28. A magnetic seed treating device as defined in claim 22, wherein a tangent drawn to the converging part of the wall upstream of the area of maximum constriction is at a maximum of about 15° relative to the passageway axis, tangents drawn to the converging part of the wall having smaller and smaller angles relative to the passageway axis as the wall approaches the plane of maximum constriction.

29. A magnetic seed treating device as defined in claim 28, wherein tangents drawn to the diverging part of the wall reach a maximum divergent angle of about 5° slightly downstream of the area of maximum constriction.

30. A magnetic seed treating device as defined in claim 28, wherein tangents drawn to the converging part are at smaller and smaller angles relative to the passageway axis upstream of the maximum angle of about 15°, and tangents drawn to the diverging part are at smaller and smaller angles relative to the passageway axis downstream of the maximum angle of about 5°.

31. A magnetic seed treating device as defined in claim 28 wherein said mounting means includes a magnet enclosing capsule of a hollow elongated configuration mounted substantially coaxially within said passageway, said capsule having a maximum cross-sectional area at said plane of maximum constriction, said capsule having a maximum draft angle of about 1° upstream of said plane and a maximum draft angle of about 10° downstream of said plane.

* * * * *